United States Patent
Tidestav et al.

(10) Patent No.: US 11,064,406 B2
(45) Date of Patent: Jul. 13, 2021

(54) METHOD FOR USING A SHORT SIGNAL IDENTITY IN COMMUNICATION BETWEEN A RADIO TERMINAL AND A RADIO ACCESS NODE, A RADIO TERMINAL AND A RADIO ACCESS NODE

(71) Applicant: Telefonaktiebolaget LM Ericsson (publ), Stockholm (SE)

(72) Inventors: Claes Tidestav, Bålsta (SE); Stephen Grant, Pleasanton, CA (US)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 562 days.

(21) Appl. No.: 15/777,692

(22) PCT Filed: May 3, 2018

(86) PCT No.: PCT/EP2018/061335
§ 371 (c)(1),
(2) Date: May 21, 2018

(87) PCT Pub. No.: WO2018/202770
PCT Pub. Date: Nov. 8, 2018

(65) Prior Publication Data
US 2021/0144600 A1    May 13, 2021

Related U.S. Application Data

(60) Provisional application No. 62/502,093, filed on May 5, 2017.

(51) Int. Cl.
*H04W 36/00* (2009.01)
*H04L 5/00* (2006.01)
*H04W 24/10* (2009.01)

(52) U.S. Cl.
CPC ....... *H04W 36/0085* (2018.08); *H04L 5/0048* (2013.01); *H04W 24/10* (2013.01); *H04W 36/0061* (2013.01)

(58) Field of Classification Search
None
See application file for complete search history.

(56) References Cited

U.S. PATENT DOCUMENTS

| 2006/0068823 | A1* | 3/2006 | Kwon | H04W 28/06 455/517 |
| 2010/0227617 | A1 | 9/2010 | Jung et al. | |
| 2016/0286424 | A1 | 9/2016 | Li et al. | |

FOREIGN PATENT DOCUMENTS

WO    2018 059711 A1    4/2018

OTHER PUBLICATIONS

PCT Notification of Transmittal of the International Search Report and the Written Opinion of the International Searching Authority, or the Declaration for International application No. PCT/EP2018/061335—dated Jul. 9, 2018.
(Continued)

*Primary Examiner* — Adolf Dsouza
(74) *Attorney, Agent, or Firm* — Christopher & Weisberg, P.A.

(57) ABSTRACT

A method in a radio access node for communicating with a radio terminal in a network system includes transmitting to the radio terminal a mapping between a first set of identifiers and a second set of identifiers, each identifier identifying a reference signal in a network system, and communicating with the radio terminal using at least one identifier in the first set of identifiers.

21 Claims, 5 Drawing Sheets

(56) References Cited

OTHER PUBLICATIONS

3GPP TSG-RAN WG1 #88; Athens, Greece; Source: Ericsson; Title: Beam management overview (R1-1702674)—Feb. 13-17, 2017.
3GPP TSG-RAN WG1 #89ah-NR; Qingdao, China; Source: Ericsson; Title: Mechanism to recover from beam failure (R1-1711017)—Jun. 27-30, 2017.
3GPP TSG-RAN WG1 #89ah-NR; Qingdao, China; Source: Ericsson; Title: On the use of SS for beam management (R1-1711019)—Jun. 27-30, 2017.
3GPP TSG-RAN WG1 #89ah-NR; Qingdao, China; Source: Ericsson; Title: Further results on beam management without beam indication (R1-1711020)—Jun. 27-30, 2017.
3GPP TS 36.101 v14.3.0; Technical Specification; 3rd Generation Partnership Project; Technical Specification Group Radio Access Network; Evolved Universal Terrestrial Radio Access (E-UTRA); User Equipment (UE) radio transmission and reception (Release 14)—Mar. 2017.
3GPP TS 36.331 v14.2.2; Technical Specification; 3rd Generation Partnership Project; Technical Specification Group Radio Access Network; Evolved Universal Terrestrial Radio Access (E-UTRA); Radio Resource Control (RRC); Protocol specification (Release 14)—Apr. 2017.
Examination Report issued by Intellectual Property India for Application No. 201847018609—dated Aug. 5, 2020.

\* cited by examiner

| Short identity | Long identity |
|---:|---:|
| 0 | 367 |
| 1 | 268 |
| 2 | 111 |
| 3 | 36 |
| 4 | 589 |
| 5 | 254 |
| 6 | 129 |
| 7 | 59 |

800

METHOD FOR USING A SHORT SIGNAL IDENTITY IN COMMUNICATION BETWEEN A RADIO TERMINAL AND A RADIO ACCESS NODE, A RADIO TERMINAL AND A RADIO ACCESS NODE

PRIORITY

This nonprovisional application is a U.S. National Stage Filing under 35 U.S.C. § 371 of International Patent Application Ser. No. PCT/EP2018/061335 filed May 3, 2018, and entitled "A Method for Using a Short Signal Identity in Communication Between a Radio Terminal and a Radio Access node, a Radio Terminal an a Radio Access Node" which claims priority to U.S. Provisional Application No. 62/502,093 filed May 5, 2017, both of which are hereby incorporated by reference in their entirety.

TECHNICAL FIELD

The present disclosure relates to a method in a radio access node for communicating with a radio terminal in a network system, a method in a radio terminal communicating with a radio access node in the network system, the radio network system adapted to perform the method, the radio access node adapted to perform the method, the radio terminal adapted to perform a method, a computer program, and a computer program product.

BACKGROUND

In wireless communication systems handover is an important part. A handover is the process of transferring an ongoing connection of a radio terminal from a radio access node, i.e. a serving base station, to another radio access node, i.e. a target base station, in order to accomplish good service over a larger area. The radio terminal may also be called a wireless device where communication may be carried out over any air interface and may be referred to as an end user device or user equipment, UE, in the case of 3GPP 4G and 5G Long Term Evolution, LTE, as well as 5G New Radio, NR. Generally, handover should happen without any loss of data and with as small interrupt as possible.

To enable a handover, it is necessary to find a suitable radio access node providing a target cell, and to ensure that it is possible for a radio terminal to sustain reliable communication with that target cell. Candidates for a suitable target cell may usually be stored in so-called neighbor lists, which are stored at least at the serving base station. To make sure that it is possible to sustain reliable communication with the target cell, the connection quality in the target cell may be estimated before the handover may take place.

The quality in the target cell may be estimated by measurements related to the radio terminal. Both downlink or uplink measurements can be considered. Relying solely on uplink measurements may be misleading, since the uplink connection quality may be different from the downlink connection quality.

Therefore, handovers in cellular systems are conventionally based on downlink measurements. The radio terminal then performs measurements on reference signals transmitted from the radio access nodes. In both Long Term Evolution, LTE, and in the next generation cellular system New Radio, NR, these signals may include a so-called primary synchronization signal, PSS, and a so-called secondary synchronization signal, SSS.

Such handovers are typically performed between cells and are generally considered to be associated with a significant performance penalty as these involve for instance changing various configurations, updating parameters, and clearing buffers. This performance penalty may become worse if one handover is followed by a handover back to the previous serving cell, a so-called ping-pong handover. To avoid such a situation, handovers may only be performed when it is rather certain that the target cell is better than the serving cell, and that the target cell will also remain better than the serving cell for some time.

To achieve such certainty, handover algorithms may use measurement filtering, and also hysteresis as it may typically be required that the target cell is a certain degree better than the serving cell to trigger a handover. In that respect, an algorithm using hysteresis may specify that an interval above the threshold is present, in which interval no handover will be triggered to avoid a ping-pong handover from a source cell to a target cell and/or that an interval below the threshold is present, in which interval no handover will be triggered to avoid a ping-pong handover from the target cell to the source cell.

Moreover, to reduce the amount of measurement reporting, handover algorithms may use event-driven reporting, so that the radio terminal may perform filtering and may only send the measurement report when the triggering condition, e.g., the hysteresis condition, is fulfilled.

The report that may be transmitted when the triggering conditions are fulfilled may contain an explicit identifier of the target cell, along with relevant measurement results, both for the target cell and possibly also other cells.

Cell identifiers, IDs, are conventionally rather long, i.e. require a lot of information to be transmitted, e.g. in form of bits. In LTE, there are 504 possible values for the physical cell ID, Physical Cell Identifier (PCI), and in the next generation cellular system of 5G NR, there may be significantly more cell IDs available (it is envisaged that the number of cell IDs will increase to about 1000).

In both LTE and NR, the PCI can be derived from the PSS and SSS. Moreover, in NR, there may be a possibility to distinguish a large number of beams for every cell, and each such beam may have an ID as well. It is currently discussed that up to 64 beams are available per cell. For instance, to identify a beam in a measurement report, it may very well be that 15 or more bits are therefore required. In many cases, using such long IDs may clearly lead to significant overhead.

In addition to the above described mobility on the cell level, i.e. cell level mobility (handover from one cell to another cell), NR may also support mobility within cells, so-called beam management ("handover between two beams of one cell"). Beam management may use less comprehensive reporting, which may fit in Layer 1, L1, control channels, e.g., Physical Uplink Control Channel, PUCCH, where it is important to minimize signaling overhead. Often, beam management may rely on different reference signals, e.g., channel state information reference signal, CSI-RS, compared to cell-level mobility. Since the measurement reports are short, the identities are desired to be also short, typically only a few bits may be used to identify a measurement, since, for example, all the measurements are related to reference signals transmitted from the current cell.

Since CSI-RS is conventionally the main reference signal used for beam management, and thus is configured for each radio terminal based on dedicated radio resource control, RRC, signaling, and the reference signal used for inter-cell mobility, the SSs, is typically always present, i.e., it is an always-on signal, and where the radio terminal may only need a minimum configuration, it would be advantageous to make use of the always-on signal also for beam management.

However, unlike CSI-RS identifiers, the full identifier of the SS is too long to fit into the typical payload of a L1 control channel.

Therefore, it is desired to provide measures which may allow for an easy and efficient way of inter-cell mobility and beam management with low load over the air interface.

SUMMARY

The above-mentioned problems and drawbacks of the conventional methods are solved by the subject matter of the independent claims. Further preferred embodiments are described in the dependent claims.

According to an aspect of the present invention there is provided a method in a radio access node for communicating with a radio terminal in a network system. The method comprises the following steps of transmitting to the radio terminal a mapping between a first set of identifiers and a second set of identifiers, wherein each identifier identifies a reference signal in a network system, and of communicating with the radio terminal using at least one identifier in the first set of identifiers.

According to another aspect of the present invention there is provided a method in a radio terminal communicating with a radio access node in a network system, comprising the following steps of receiving a mapping between a first set of identifiers and a second set of identifiers, wherein each identifier identifies a reference signal in the network, and of communicating with the radio access node using the first set of identifiers.

According to another aspect of the present invention there is provided a radio network system adapted to perform a method embodiment of the present invention such as a method in the radio access node according to the above described aspect and a method in the radio terminal according to the above described aspect.

According to another aspect of the present invention, a radio network system is provided. The network system comprises a radio access node according any of the below described aspects and a radio terminal according to any of the below described aspects.

According to another aspect of the present invention there is provided a radio access node adapted to perform a method in the radio access node according to the described aspect.

According to another aspect of the present invention, a radio access node for communicating with a radio terminal in a network system is provided. The radio access node comprises at least one processor, a transceiver and a memory. In the memory, instructions are stored, which, when being executed by the at least one processor, causes the radio access node to transmit, via the transceiver, to a radio terminal a mapping between a first set of identifiers and a second set of identifiers. Each identifier identifies a reference signal in a network system. Further, the radio access node is caused to communicate, via the transceiver, with the radio terminal using at least one identifier in the first set of identifiers.

According to another aspect of the present invention there is provided a radio terminal adapted to perform a method in the radio terminal according to the above described aspect.

According to another aspect of the present invention, a radio terminal for communicating with a radio access node in a network system is provided. The radio terminal comprises at least one processor, a transceiver and a memory. In the memory, instructions are stored, which, when being executed by the at least one processor, causes the radio terminal to receive, via the transceiver, a mapping between a first set of identifiers and a second set of identifiers. Each identifier identifies a reference signal in the network. The radio terminal is further caused to communicate, via the transceiver, with the radio access node using the first set of identifiers.

According to another aspect of the present invention a computer program is provided that comprises code. The code, when executed on processing resources, instructs the processing resources to perform a method according to any of the above described aspects.

According to yet another aspect of the present invention a computer program product is provided that stores a code. The code, when executed on processing resources, instructs the processing resources to perform a method according to any of the above described aspects.

BRIEF DESCRIPTION OF THE DRAWINGS

Embodiments of the present invention, which are presented for better understanding the inventive concepts, but which are not to be seen as limiting the present invention, will now be described with reference to the figures in which.

DETAILED DESCRIPTION

Figure 1:
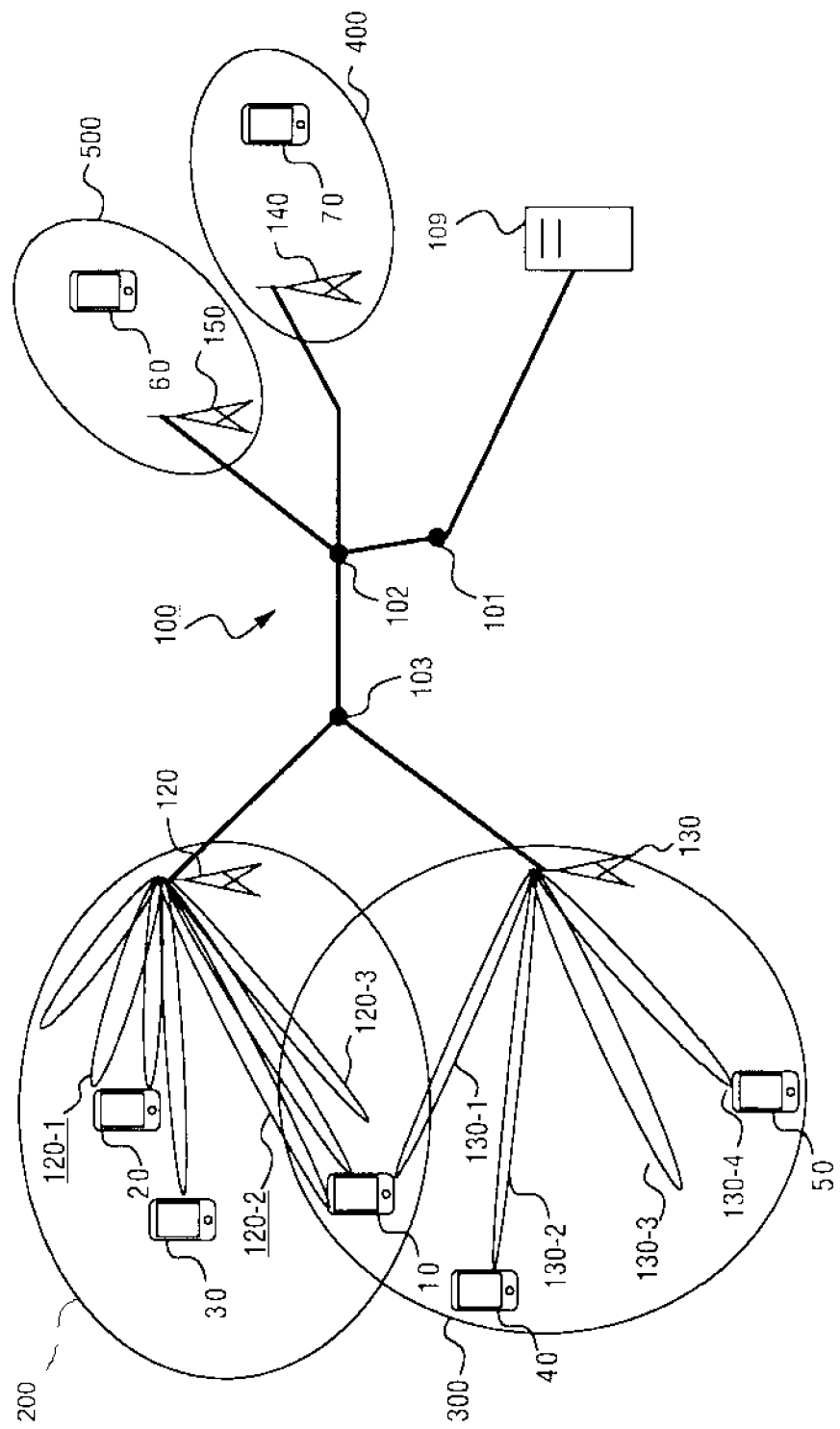
FIG. 1 shows a schematic overview of an exemplary network environment.

FIG. 1 shows a schematic overview of an exemplary network environment. A network 100, for instance a network system or a communication network, includes a number of network elements 101-103 such as network nodes, routers, gateways, switches, switching centers, base stations, wireless or wire-bound links, and the like and radio network nodes 120, 130, 140, 150. In general, the purpose of the network 100 will be to provide a network service to a plurality of radio terminals 10-70, wherein the usual services include, telephony, video-telephony, chatting, internet browsing, email access, and the like. For this purpose, the network elements 101-103 will convey data via radio network nodes 120, 130, 140, 150 to and from a plurality of radio terminals 10-70. Note that the communication with the network 100, i.e. between the network elements 102-103 and radio network nodes 120, 130, 140, 150, can be wireless and/or wired. The radio network nodes 120, 130 may communicate with the individual radio terminals 10-70 via the usual radio links for transmitting and receiving data to and from a radio terminal 10-70. The network 100 may further include some sort of network entity 109, such as a server or a resource in a data center. The network entity 109 may also have a direct link to any one of the radio network nodes 120, 130, 140, 150 or the radio terminals 10-70. The radio network nodes 120, 130, 140, 150 can be embodied for example as 4G eNodeBs, 5G eNodeBs, or 5G NR gNodeBs.

In cellular systems, there may be a plurality of cells 200, 300, 400, 500 formed by the respective serving radio access node 120, 130, 140, 150, each of which node transmitting a signal, i.e. a reference signal, which signal identifying the cell 200, 300, 400, 500. In LTE for instance the respective identifier is called a physical cell identifier, PCI. It is noted that the term "radio network node" and the term "radio access node" is interchangeably used with respect to the nodes 120, 130, 140, 150.

In LTE, the PCI may take any of several hundred values, e.g. one of 504 values, and in NR, even more PCI values may be available, e.g. one order of magnitude more values. For example in 5G NR, there are 1008 possible values of the cell IDs, and the PCI may take one value of the 1008 possible values. In addition, each cell in NR may be transmitting several beams 120-1, 120-2, 120-3, 130-1, 130-2, 130-3, 130-4, where each beam 120-1, 120-2, 120-3, 130-1, 130-2, 130-3, 130-4 may also be provided with an identifier unique at least within the corresponding cell 200, 300, 400, 500. For simplicity, only the beams 120-1, 120-2, 120-3, 130-1, 130-2, 130-3, 130-4 transmitted from the nodes 120, 130 are labeled in FIG. 1, and, within the cell 200, only a subset of all the beams 120-1, 120-2, 120-3, are labeled in FIG. 1.

The radio terminal 10-70 may be placed in a certain location for instance at a certain time. In this location the radio terminal 10-70 may receive signals from nearby radio access nodes 120, 130, 140, 150. Each node 120, 130, 140, 150 may use for instance up to 64 beams for communication. Each node 120, 130, 140, 150 may be provided with an identifier that is unique in the location compared to nearby nodes 120, 130, 140, 150. For example, in NR, the beam ID may be carried in the Physical Broadcast Channel, PBCH.

To uniquely identify a beam 120-1, 120-2, 120-3, 130-1, 130-2, 130-3, 130-4, for instance for the purpose of a measurement report identification, or a measurement order (e.g. also called command), an identifier may be needed to distinguish the respective beam from all other beams 120-1, 120-2, 120-3, 130-1, 130-2, 130-3, 130-4 within the network system 100. Due to the large number of possible values of the identifier, a large number, e.g., up to 15, of bits will be needed to represent the identifier. Such long identifiers may be used in some measurement reports and in some commands.

However, to enable to refer to signals, reports or commands, that are associated with beams 120-1, 120-2, 120-3, 130-1, 130-2, 130-3, 130-4, these long identities may become infeasible as the load over the air interface may be too high.

According to the present disclosure the method in a radio access node 120, 130, 140, 150 for communicating with a radio terminal 10-70 may comprise the following step of transmitting to the radio terminal 10-70 a mapping between a first set of identifiers and a second set of identifiers, each identifier (sometimes also referred to as identity) identifying a reference signal in a network system 100.

In some embodiments, the mapping may specify that one identifier of the first set may be (e.g. uniquely) mapped to one identifier of the second set. Each set may comprise one identifier or more than one identifier. Hence, the mapping may comprise one or more pairs of first and second identifiers.

Thus the present disclosure provides measures allowing for an easy and efficient way of inter-cell mobility and beam management with low load over the air interface.

In other words, to handle the above limitations, the present disclosure describes a method to form a 1:1 mapping between a set of long reference signal identities (e.g. identifiers in second set of identifiers) to a set of short identities (e.g. identifiers in first set of identifiers). The mapping may be unique in the sense that the radio terminal receiving the mapping may be enabled to uniquely map a long identifier to a short identifier. The mapping may be sent to the radio terminal from the network node as part of a measurement configuration. The measurement configuration may for instance be transmitted on Layer 3, e.g. using RRC, Radio Resource Control, which can be transmitted either using dedicated or broadcast signaling. For example, in NR, the measurement configuration could be carried in the RRC broadcasted System Information Block, SIB. That is, the mapping may assign a short identifier to a longer identifier or vice versa.

For instance, the mapping may be between one identifier in the first set and one identifier in the second set, or in other words there may be a set of mappings, where each mapping may be from one first identifier to one second identifier. That is, there may be an already compiled mapping, such as a list or a table, being sent to the radio terminal, where the mapping may be between different pairs of identifiers in the two sets.

Instead of sending an explicit mapping from the radio access node 120, 130, 140, 150 to the radio terminal 10-70, parts of the mapping could be implicitly transmitted. For example, the radio terminal 10-70 may receive the beam indices explicitly and may add the serving cell ID (e.g. obtained separately by broadcast from the network node 120, 130, 140, 150) to derive the full identities in the second set.

The method may further comprise the step of communicating with the radio terminal 10-70 using at least one identifier in the first set of identifiers. That is, further communication between the radio terminals 10-70 and the network 100, particularly the radio access nodes 120, 130, 140, 150, according to the present disclosure may use the short identity. It is noted that each radio access node 120, 130, 140, 150 will perform or determine a corresponding mapping between the short and long identities for its own served radio terminals 10-70 by using information collected from these radio terminals 10-70, so that coordination between the mappings of different nodes 120, 130, 140, 150 might not be needed.

According to one embodiment of the present disclosure at least one of the identifiers in the first and/or second set of identifiers identifies a reference signal of one of a cell 200, 300, 400, 500, a beam 120-1, 120-2, 120-3, 130-1, 130-2, 130-3, 130-4, and a beam 120-1, 120-2, 120-3, 130-1, 130-2, 130-3, 130-4 within a cell 200, 300, 400, 500. That is, via the mapping, the short identifier may also identify a cell 200, 300, 400, 500, beam 120-1, 120-2, 120-3, 130-1, 130-2, 130-3, 130-4 or a beam 120-1, 120-2, 120-3, 130-1, 130-2, 130-3, 130-4 within a cell 200, 300, 400, 500, but it may be the long identifier that actually identifies each one of these. In other words, an identifier in the first set of identifiers, e.g. short identifier or long identifier, identifies the reference signal and one of a cell 200, 300, 400, 500, beam 120-1, 120-2, 120-3, 130-1, 130-2, 130-3, 130-4, or a beam 120-1, 120-2, 120-3, 130-1, 130-2, 130-3, 130-4 within a cell 200, 300, 400, 500, and the corresponding identifier in the second set of identifiers, e.g. long identifier or short identifier, made via the mapping and the long identifier also identify the respective cell 200, 300, 400, 500, beam 120-1, 120-2, 120-3, 130-1, 130-2, 130-3, 130-4, or beam 120-1, 120-2, 120-3, 130-1, 130-2, 130-3, 130-4 within a cell 200, 300, 400, 500.

According to one embodiment of the present disclosure, each identifier in the first set of identifiers may be represented using fewer bits than the corresponding identifier in the second set of identifiers. That is, in other words, the short identifier may use or require a reduced amount of bits for identifying a reference signal. In other words, to overcome limitations, the present disclosure provides a method to provide a mapping between the above described long signal identity and a short identity, i.e. an identity using or requiring fewer bits than the corresponding long identity.

The long identity may belong to a second set of identities and the short identity may belong to a first set of identities.

According to yet another embodiment of the present disclosure the second set of identifiers is used to identify a reference signal for intercell mobility between cells 200, 300, 400, 500 and/or beam management. For instance, the second set of identifiers, i.e. the long identifiers, may identify a reference signal such as a so-called primary synchronization signal, PSS, a so-called secondary synchronization signal, SSS, and the PBCH. A combination of PSS, SSS and the PBCH can be referred to as a SS/PBCH block. As explained above, a cell ID may be carried in NR in the PBCH. In NR the identifier may even identify a channel state information reference signal, CSI-RS.

According to another embodiment of the present disclosure the reference signals identified by the first set of identifiers are determined based on measurements of corresponding reference signals performed by the radio terminal 10-70. That is, the radio terminal 10-70 may, for instance per each beam 120-1, 120-2, 120-3, 130-1, 130-2, 130-3, 130-4 of each node 120, 130, 140, 150, from which the radio terminal 10-70 receives a signal, measure reference signals such as PSS, SSS, CSI-RS and may report the measurement results back to the node 120, 130, 140, 150. The node 120, 130, 140, 150 may then establish the mapping by assigning a short identifier unique for the radio terminal 10-70 to each long identifier which has been reported. It is noted that for ease of illustration in FIG. 1, the cells 200, 300, 400, 500 with the respective radio nodes 120, 130, 140, 150 and the radio terminals 10, 20, 30, 40, 50, 60, 70 are placed apart from one another. However, it is evident that a radio terminal 10, 20, 30, 40, 50, 60, 70 may only receive signals and perform respective actions of that signals for those radio access nodes 120, 130, 140, 150 and/or beams 120-1, 120-2, 120-3, 130-1, 130-2, 130-3, 130-4 which the radio terminal 10-70 is enabled to receive as the radio terminal 10-70 is placed within the coverage area of those nodes 120, 130, 140, 150 and/or is in the reception area for those beams 120-1, 120-2, 120-3, 130-1, 130-2, 130-3, 130-4.

In a more general another embodiment of the present disclosure, the method further comprises the step of determining, based on one or more measurement reports received from the radio terminal (e.g. over a time period) and each including at least one of the identifiers in the second set of identifiers, the corresponding set of first identifiers to be used in the mapping. That is, a measurement report includes per each reported identifier a measurement result, for instance of a signal strength as measured by the radio terminal 10-70 for instance on downlink, DL, reference signals such as the PSS, SSS and/or CSI-RS, and the corresponding identifier.

In other words, the set of long identities in the second set may be established in a separate step, which may be called a training step, whereby radio terminals 10-70 in a cell 200, 300, 400, 500 may be configured to report long identities for some period of time (e.g. in respective measurement reports) until a list of identities is available at the nodes 120, 130, 140, 150. The serving radio access node 120, 130, 140, 150 may then determine a subset of the reported identities for which to configure radio terminals 10-70. The subset may include, for example, the most often reported identities in the training step or those identifiers which corresponding measurement result was above a certain threshold.

Alternatively, the serving radio access node 120, 130, 140, 150 may then configure the radio terminal 10-70 for all reported identities. Therefore, in a more general embodiment of the present disclosure, the number of identifiers in the first set is equal to or less than the number of identifiers in the second set.

According to another embodiment of the present disclosure, the radio terminal 10-70 may perform measurements on a reference signal. To this end, the node 120, 130, 140, 150 may send a measurement command to the radio terminal 10-70 and identifies the reference signal to be measured either by a long identity or a short identity. Alternatively, the radio terminal 10-70 may perform measurements periodically or event triggered, and may send the measurement reports to the node 120, 130, 140, 150 without explicit request or command from the node 120, 130, 140, 150. For a reference signal where the long identity is included in the mapping, the radio terminal 10-70 may send a measurement report corresponding to the short identity to the network 100, where the measurement report may also include the short identity itself. It is to be understood that the measurement report may include a measurement result for more than one references signal and correspondingly more than one short identifier. With respect to this embodiment, the node 120, 130, 140, 150 may receive, according to an embodiment of the present disclosure, from the radio terminal 10-70 a measurement report including at least one of the identifiers in the first set of identifiers. The measurement report reports about one or more measurement results of the radio terminal 10-70 on one or more reference signals, each being identified by the corresponding one of the identifiers in the second set of identifiers.

According to yet another embodiment of the present disclosure the node may send a command to the radio terminal 10-70. The command includes one of the identifiers in the first set of identifiers and instructs the radio terminal 10-70 to execute the command on a signal identified by one of the identifiers in the second set of identifiers. That is, the command may instruct the radio terminal to perform a measurement and report back to the network 100 the result of the performed measurement. Here, the short identity may be used in the command to execute on the reference signal identified by the corresponding long identity.

In other words, the radio access node 120, 130, 140, 150 may also refer to a long reference signal identity by sending a command (such as e.g. an L1 control message (e.g. on Physical Downlink Control Channel, PDCCH)) comprising a short identity to the radio terminal 10-70. The radio terminal 10-70 may then map the short reference signal identity to the long reference signal identity and apply the action in the command message on the (long) reference signal. For example, the command message may be an indication to the radio terminal 10-70 to switch to a new receive beam corresponding to a previous measurement on the reference signal associated with the short identity. In more detail, the indication may state which transmit beam 120-1, 120-2, 120-3, 130-1, 130-2, 130-3, 130-4 (which corresponds to a certain reference signal) the node 120, 130, 140, 150 will use. The radio terminal 10-70 may have remembered which receive beam the radio terminal 10-70 used when the radio terminal 10-70 performed the measurement on that reference signal, and the radio terminal 10-70 switches to that receive beam.

According to another more general embodiment of the present disclosure, the node 120, 130, 140, 150 transmits a command to the radio terminal 10-70, the command including one of the identifiers in the first set of identifiers and instructing the radio terminal 10-70 to change a beam 120-1, 120-2, 120-3, 130-1, 130-2, 130-3, 130-4 serving the radio terminal 10-70 to a different beam 120-1, 120-2, 120-3, 130-1, 130-2, 130-3, 130-4 identified by one of the identifiers in the second set of identifiers. That is, the reference signal identified by the second identifier may identify a beam 120-1, 120-2, 120-3, 130-1, 130-2, 130-3, 130-4.

Hence, in some embodiments, the identifier(s) in the second set (e.g. the long identifiers) may identify a beam 120-1, 120-2, 120-3, 130-1, 130-2, 130-3, 130-4 (e.g. a transmit beam 120-1, 120-2, 120-3, 130-1, 130-2, 130-3, 130-4 of the network node 110, 120, 130, 140, 150) and the reference signals transmitted by that beam 120-1, 120-2, 120-3, 130-1, 130-2, 130-3, 130-4. For example, the sent reference signals are unique, or are transmitted separately with respect to their timing.

For instance, the radio access node 120 may send a command for a beam switch to the radio terminal 10. Accordingly, the radio terminal may be ordered to switch from beam 120-2 to beam 120-3, i.e. a beam switch within the cell 200. In the alternative the radio terminal 10 may also be instructed to perform a beam switch for instance from beam 120-3 to beam 130-1 serving a different cell 300 provided by the radio access node 130, i.e. a beam switch between two different cells 200 and 300.

Therefore, the short identity may be used to indicate that the radio terminal 10-70 should change its serving beam 120-1, 120-2, 120-3, 130-1, 130-2, 130-3, 130-4 identified by the long identity.

For instance, an advantage of embodiments of the present disclosure is that a size of a measurement report in the uplink and control messages in the downlink may be reduced.

Additionally or alternatively, embodiments of the present disclosure may describe a technique to enhance beam management functionality by making use of additional always-on reference signals to discover new beams. For instance, the radio terminal 10-70 may perform measurements on reference signals in the second set, and may report these measurements to the radio access node 110, 120, 130, 140, 150, so that the radio access node 110, 120, 130, 140, 150 can determine the corresponding set of first identifiers.

Figure 2:
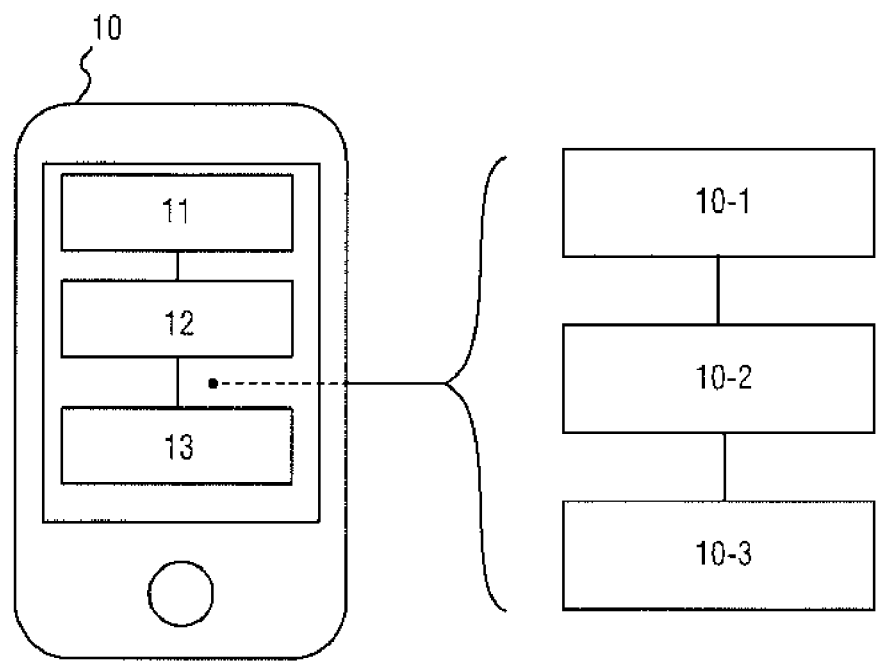
FIG. 2 shows a radio terminal adapted to perform a method according to an embodiment the present invention.

FIG. 2 shows a radio terminal 10 adapted to perform a method according to embodiments of the present disclosure. The radio terminal 10 may correspond to any of the radio terminals 10-70 shown in FIG. 1.

The radio terminal 10 is for connecting to a radio network system including at least a radio access node, for example at least one of the radio access nodes 120, 130, 140, 150 shown in FIG. 1, and at least one of the radio terminals 10-70.

In a first embodiment shown on the right side of FIG. 2, the radio terminal 10 may include at least one processor 10-1, a memory 10-2, and a transceiver 10-3 with receiving and transmitting capabilities. The at least one processor 10-1 is coupled to the memory 10-2 and the transceiver 10-3. A computer program code comprising code is stored in the memory 10-2. The code is executable by the at least one processor 10-1. When the at least one processer 10-1 executes the code, the radio terminal 10 is caused to perform the above described steps.

In a second embodiment shown on the left side of FIG. 2, the radio terminal 10 includes an optional storage module 11, an optional processing module 12, and a communication module 13 for sending and/or receiving messages.

For instance, the radio terminal 10 may use the transceiver 10-3 or the communication module 13 for receiving the mapping between the set of first identifiers and the set of second identifiers and may use the memory 10-2 or the storage module 11 to store the mapping.

The radio terminal 10, for example the transceiver 10-3 in cooperation with the processor 10-1 and the memory 10-2, or the communication module 13 in cooperation with the storage module 11 and the processing module 12, may use the first set of identifiers as described above with respect to FIG. 1.

According to one embodiment of the present disclosure the mapping is received by the radio terminal 10 as part of a measurement configuration as described above with respect to FIG. 1. For instance the radio terminal 10 may use the transceiver 10-3 or the communication module 13 for receiving the measurement configuration from the network 100 or the radio access node 120, 130, 140, 150.

According to another embodiment of the present disclosure the radio terminal 10-70 may, using the transceiver 10-3 or the communication module 13, receive reference signals from radio access nodes 120, 130, 140, 150 identified by the first set of identifiers. The radio terminal 10-70 may then perform an action on the reference signal identified in the received mapping. Such an action may be sending a measurement report, switch beams and/or perform a handover between cells.

According to yet another embodiment of the present disclosure the radio terminal 10-70 may, using the transceiver 10-3 or the communication module 13, send one or more measurement reports to the network system, each including at least one of the identifiers in the second set of identifiers, for determining the corresponding set of first identifiers to be used in the mapping.

According to an embodiment of the present disclosure the radio terminal 10-70 may, using the transceiver 10-3 or the communication module 13, send a measurement report, from the radio terminal 10-70 to e.g. the radio access node 120, 130, 140, 150, including at least one of the identifiers in the first set of identifiers, the measurement report reporting about a measurement result of the radio terminal 10-70 on a reference signal identified by the corresponding one of the identifiers in the second set of identifiers and the measurement report may be compiled by using the processor 10-1, the memory 10-2, and the transceiver 10-3 or the storage module 11, the processing module 12, and the communication module 13.

According to yet another embodiment of the present disclosure the radio terminal 10 may receive a command at the radio terminal 10-70, the command including one of the identifiers in the first set of identifiers and instructing to be executed on a signal identified by one of the identifiers in the second set of identifiers. The command may be received by the transceiver 10-3 or communication module 13. Further, the command may be executed using the processor 10-1, the memory 10-2, and the transceiver 10-3 or the storage module 11, the processing module 12, and the communication module 13.

According to another embodiment of the present disclosure the radio terminal 10-70 may receive a command at the radio terminal 10-70, using the transceiver 10-3 or the communication module 13, the command including one of the identifiers in the first set of identifiers and instructing the radio terminal 10-70 to change a beam 120-1, 120-2, 120-3, 130-1, 130-2, 130-3, 130-4 serving the radio terminal 10-70 to a different beam 120-1, 120-2, 120-3, 130-1, 130-2, 130-3, 130-4 identified by one of the identifiers in the second set of identifiers as described above. The command may be received by the transceiver 10-3 or communication module 13. Further, the respective beam management or beam switch may be executed using the processor 10-1, the memory 10-2, and the transceiver 10-3 or the storage module 11, the processing module 12, and the communication module 13.

Generally, the above-mentioned processing module 12 may be a processing unit, a processing unit collection, CPU, a share of a data/processing center and so on. The storage module 11 may be for example a memory. The communication module 13 may be embodied as a transceiver.

Figure 3:
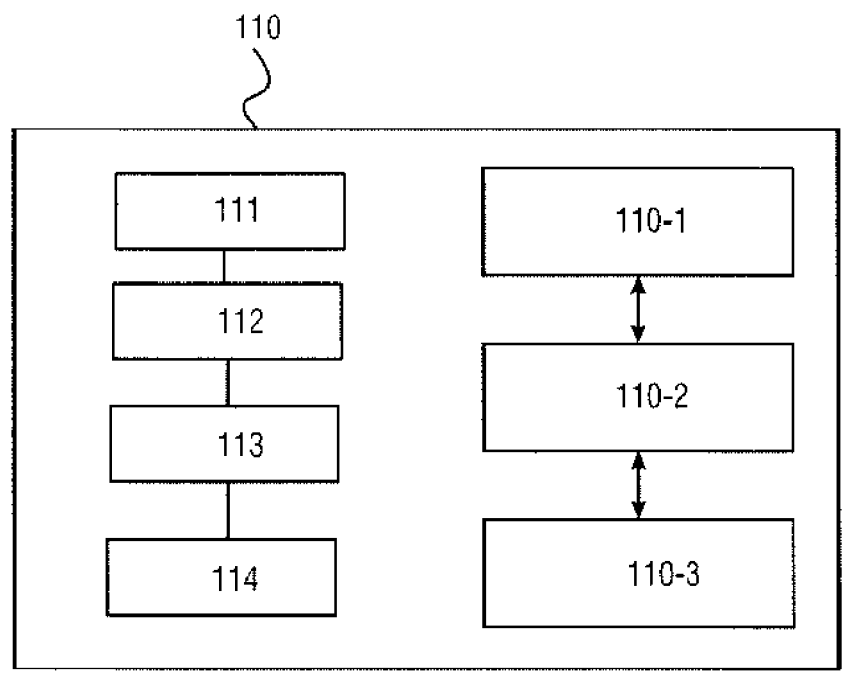
FIG. 3 shows a general network node embodiment of the invention.

FIG. 3 shows a general network node embodiment of the disclosure. The network node 110 may correspond to the network nodes 120, 130, 140, 150 described in FIG. 1. The radio network node 110 may be configured for a network system including at least the radio network node 110 and a radio terminal, for example the radio terminal 10-70 of FIG. 1 or the radio terminal 10 of FIG. 2.

In particular, the network node 110 may be adapted to perform a method according to one embodiment of the present disclosure. That is, according to one embodiment of the disclosure the network node 110 comprises an optional memory module 111, an optional processing module 112, and a communication module 113, and an optional determining module 114. In another embodiment according to the present disclosure the network node 110, i.e. network node 120, 130, 130, 140, may include at least an optional at least one processor 110-1, an optional memory 110-2, and a transceiver 110-3 with receiving and transmitting capabilities as illustrated on the right side of FIG. 3. The at least one processor 110-1 is coupled to the memory 110-2 and the transceiver 110-3. A computer program code comprising code is stored in the memory 110-2. The code is executable by the at least one processor 110-1. When the at least one processer 110-1 executes the code, the node 110 is caused to perform the above described steps.

In particular, the determining module 110-4 may determine the mapping of an identifier of a first set of identifiers, e.g. a short identifier or long identifier, to an identifier of a second set of identifiers, e.g. a long identifier or short identifier.

Generally, the above-mentioned processing module 112 may be a processing unit, a processing unit collection, CPU, a share of a data/processing center and so on. However, the determining module 114 may be provided within the processing module 112 or may be connected to either one of the memory module 111, processing module 112, or communication module 113, e.g. as a separate module.

The memory module 111 may specifically store code instructing the processing module 112 during operation to implement any method embodiment of the present disclosure.

For instance in one embodiment of the present disclosure the network entity 110 may be a radio network node such as a base station, an eNodeB, a gNode, a gateway, an external processing entity or the like.

Figure 4:
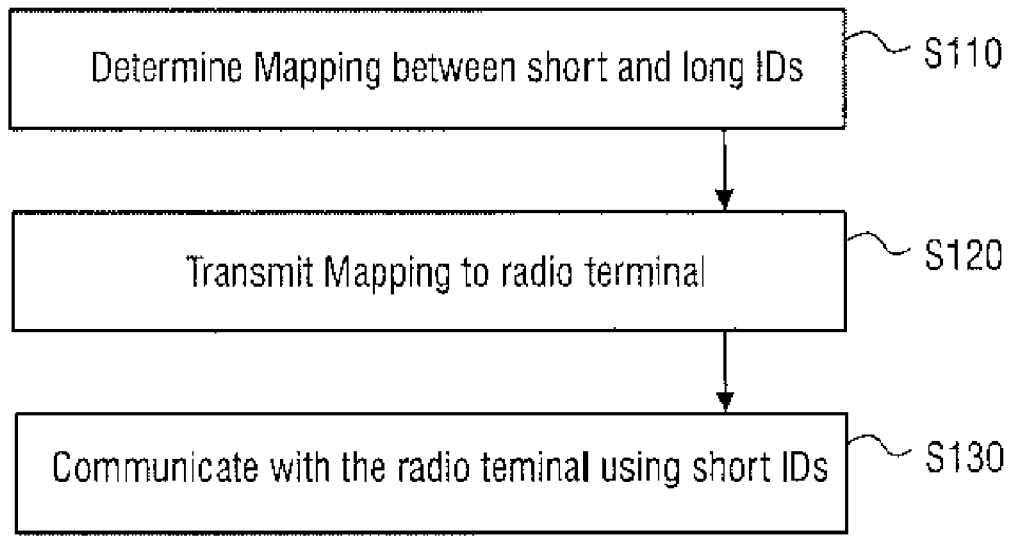
FIG. 4 shows a flowchart of a general method embodiment of the present invention.

FIG. 4 shows a flowchart of a general method embodiment of the present disclosure. The method may be performed by the node 110 of FIG. 3 or one of the nodes 110, 120, 130, 140, 150 of FIG. 1. The method may comprise the optional step of determining S110 a mapping between an identifier in a first set of identifiers to an identifier in a second set of identifiers, e.g. a mapping between a short and a long identifier or between a long and a short identifier. The term "identifier" is abbreviated "ID" in FIG. 4. The mapping may of course include mappings for more than one pair of long and short identifiers. The determination may be performed at a radio access node 110, 120, 130, 140, 150 or a separate network entity of the network 100. The determination may be further based on information provided by the respective radio terminal 10-70.

The method may further comprise transmitting S120 the mapping to the respective radio terminal 10-70 for instance by the serving radio access node 120, 130, 140, 150 or through other means for instance by the network entity 109 of the network 100.

The method may further comprise communicating S130 with the respective radio terminal 10-70 using the short identifier.

Figure 5:
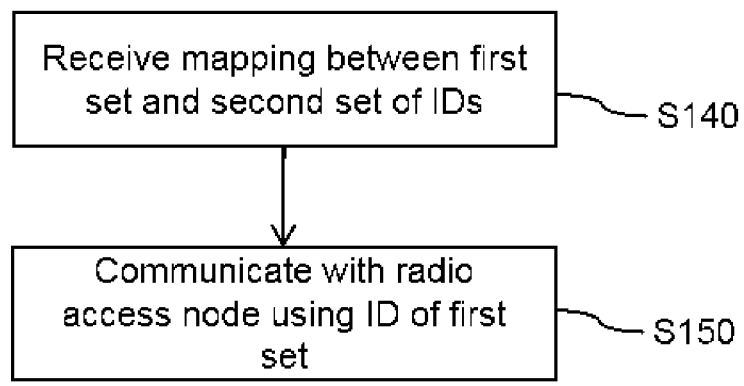
FIG. 5 shows a flowchart of another general method embodiment of the present invention.

FIG. 5 shows a flowchart of another general method embodiment of the present disclosure. The method may be performed by the radio terminal 10 of FIG. 2 or any of the radio terminals 10-70 of FIG. 1. The method comprises receiving S140 a mapping from the radio access node 110, 120, 130, 140, 150 which may serve the radio terminal 10-70. The received mapping may map an identifier in a first set of identifiers to an identifier in a second set of identifiers, e.g. the mapping may be between a short identifier and a long identifier. The term "identifier" is abbreviated "ID" in FIG. 5. The mapping may of course include mappings for more than one pair of identifiers of the first and second set. The method further comprises a step S150 of communicating with the radio access node 110, 120, 130, 140, 150 using at least one of the identifier in the first set.

Figure 6:
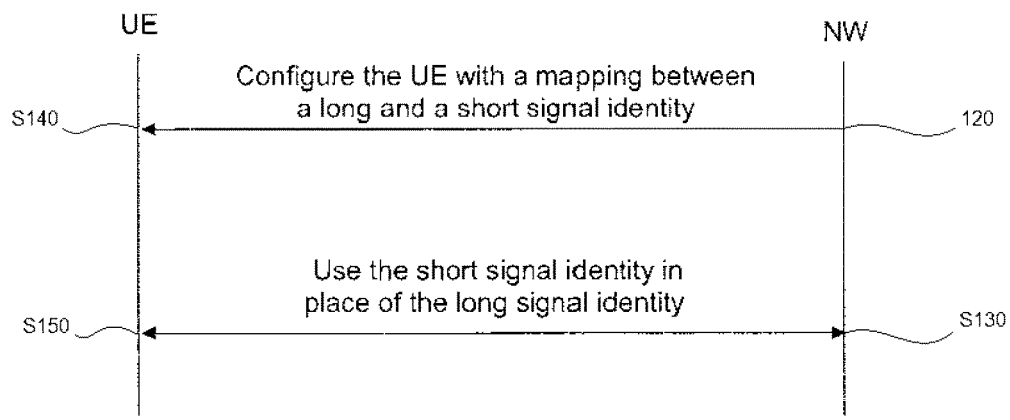
FIG. 6 shows another flowchart of a general method embodiment of the present invention.

FIG. 6 shows another flowchart of a general method embodiment of the present disclosure. The method may be performed by the radio terminal 10 of FIG. 2 or one of the radio terminals 10-70 of FIG. 1. Without loss of generality, the radio terminal 10-70 is referenced in the Figure using the term "UE" and the radio access node 110, 120, 130, 140, 150 is referenced in the Figure by the term "NW". The method may comprise the step of receiving the mapping as described in step S120 or S140. This step S140 may be embodied by the radio terminal 10-70 being configured with a mapping between a long and a short signal identity (and thus an identifier of the first set and an identifier of the second set) provided by a radio access node 120, 130, 140, 150 as shown in FIG. 6. The method may further comprise the step S150 of communicating with the node 110, 120, 130, 140, 150 using the first identifier. For example, in this step, the radio terminal 10-70 may communicate with the radio access node 120, 130, 140, 150 using the short signal identity in place of the long signal identity.

For sake of completeness it is noted that the steps S140, 150 may correspond to the respective mirror steps 120, 130 performed by the radio access node 110, 120, 130, 140, 150.

Figure 7:
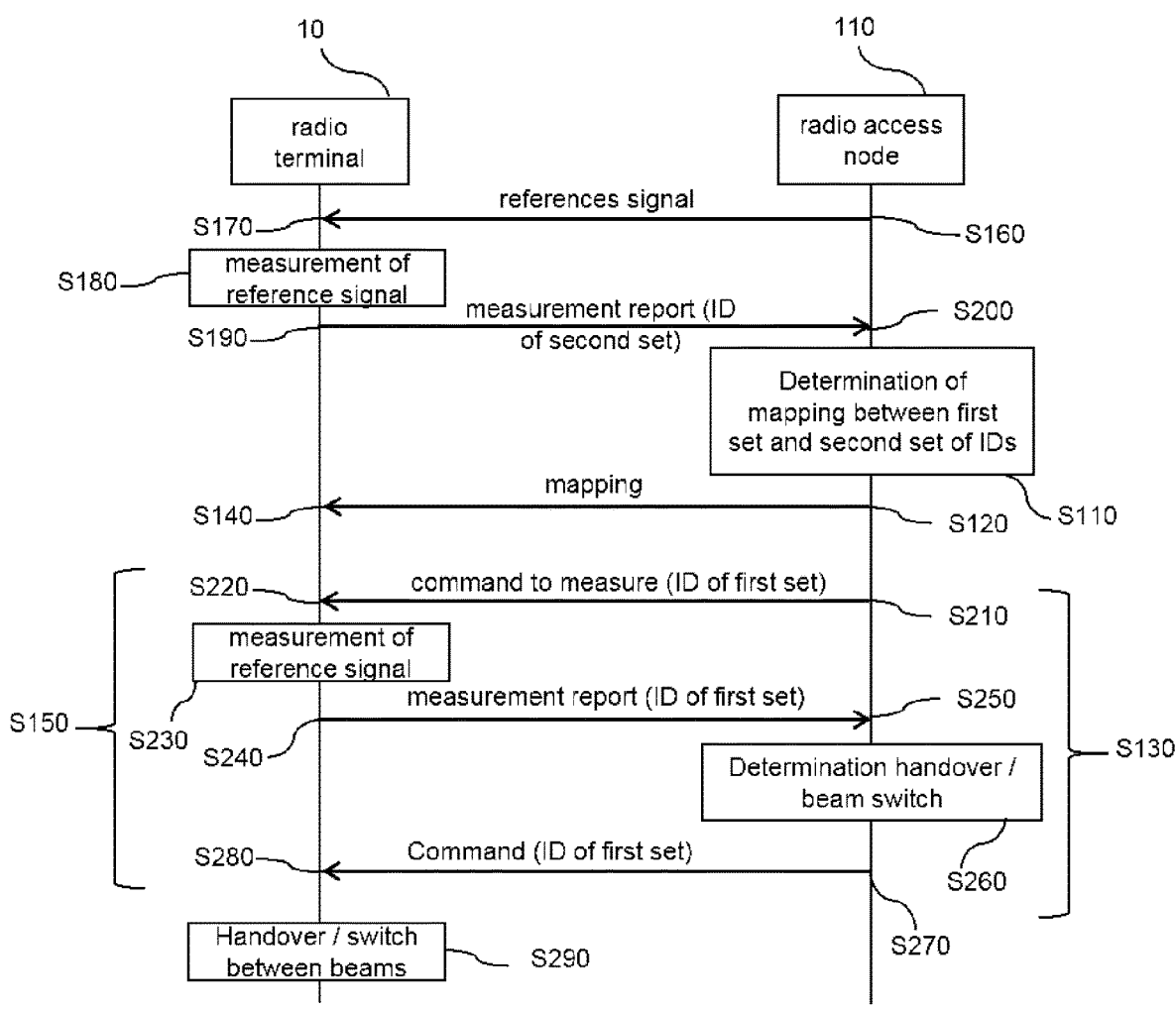
FIG. 7 shows a signaling diagram of another method embodiment of the present invention.
Figure 8:
FIG. 8 shows a table representing a mapping of a first set of identifiers to a second set of identifiers.

FIG. 7 shows a signaling diagram of a more detailed method embodiment according to the present disclosure. Respective steps are performed by either the radio terminal 10-70 in FIGS. 1, 2 or the radio access node 110, 120, 130, 140, 150 in FIGS. 1, 3. For simplicity, the radio terminal 10-70 is referenced in FIG. 7 using merely the reference sign 10, and the radio access node 110, 120, 130, 140, 150 is referenced in FIG. 7 using merely the reference sign 110.

The radio access node 110, 120, 130, 140, 150 transmits one or more reference signals in an optional step S160 to the radio terminal 10-70 and the radio terminal 10-70 receives the one or more reference signals in an optional step S170, respectively. Each reference signal is identified by a respective identifier of a set of second identifiers. For example, the identifiers correspond to long identifiers. The term "identifier" is abbreviated "ID" throughout FIG. 7.

In an optional next step S180, the radio terminal 10-70 performs measurements on the received on or more reference signals. In a step S180, the radio terminal 10-70 transmits one or more measurement reports after the step S170 to the radio access node 110, 120, 130, 140, 150 in a step S190 and the radio access node 110, 120, 130, 140, 150 receives these one or more measurement reports in a step S200. The measurement reports include one or more identifiers of the second set, and, per each included identifier, a measurement result of the performed measurement obtained in the step S180.

In an optional next step S110, the radio access node 110, 120, 130, 140, 150 determines, based on the received one or more measurement reports, corresponding identifiers of a first set of identifiers. For example, the radio access node 110, 120, 130, 140, 150 generates the identifiers in the first set for those reference signals for which a measurement report was received. The identifiers in the first set may be embodied as short identifiers when being compared to the long identifiers in the second set from a bit length perspective. Further, in the same step S110, the radio access node 110, 120, 130, 140, 150 determines a mapping between the identifiers in the first set and the identifiers in the second set.

The radio access node 110, 120, 130, 140, 150 transmits in a step S120 the determined mapping to the radio terminal 10-70 and the radio terminal 10-70 receives the mapping in a step S140 from the radio access node 110, 120, 130, 140, 150, respectively. The mapping may be transmitted as part of a measurement configuration and/or using RRC signaling. Further, the mapping may be explicitly indicated in the message.

The radio terminal 10-70 communicates with the radio access node 110, 120, 130, 140, 150 using the one or more identifiers in the first set in a step 150 and the radio access node 110, 120, 130, 140, 150 communicates with the radio terminal 10-70 using the one or more identifiers in the first set in a step 130, respectively.

In the following, further embodiments of the steps 130, 150 are described. The radio access node 110, 120, 130, 140, 150 may send a command to the radio terminal 10-70 in a step S210 and the radio terminal 10-70 receives the command in a step S220, respectively. The command includes one of the identifiers in the first set and instructs the radio terminal 10-70 to perform a measurement on a reference signal identified by one of the identifiers in the second set. The radio terminal 10-70 may accordingly perform a measurement on the respective reference signal in a step S230. After the step S230, the radio terminal 10-70 may transmit in a step S240 a measurement report to the radio access node 110, 120, 130, 140, 150 and the radio access node 110, 120, 130, 140, 150 may receive the measurement report in a step S250, respectively. The measurement report includes a measurement result of the performed measurement and the identifier in the first set which corresponds to the reference signal on which the measurement was performed and which was accordingly included in the command. Based on the received measurement result, the radio access node 110, 120, 130, 140, 150 may determine in a step S260 whether, in a first option, a handover to another cell 200, 300, 400, 500 or the same or another, different beam 120-1, 120-2, 120-3, 120-1, 130-2, 130-3, 130-4 of another, different cell 200, 300, 400, 500 served by another, different radio access node 110, 120, 130, 140, 150 is to be performed and/or whether, in a second option, a beam switch from the currently used beam 120-1, 120-2, 120-3, 120-1, 130-2, 130-3, 130-4 of the radio access node 110, 120, 130, 140, 150 serving the radio terminal 10-70 to another, different beam 120-1, 120-2, 120-3, 120-1, 130-2, 130-3, 130-4 of radio access node 110, 120, 130, 140, 150 is to be performed. In such a case, each beam 120-1, 120-2, 120-3, 120-1, 130-2, 130-3, 130-4 may be associated with a different reference signal and therefore the beam 120-1, 120-2, 120-3, 120-1, 130-2, 130-3, 130-4 may be identified, like the reference signal itself, by the respective identifier in the second set. The first option relates to intercell mobility which is optionally combined with beam management. If in the first option the determination in the step S260 is in the affirmative, the radio access node 110, 120, 130, 140, 150 may transmit a command to the radio terminal 10-70 in a step S270 and the radio terminal 10-70 may receive the command in a step S280, respectively. The command includes an instruction for the radio terminal 10-70 to switch from the current cell 200 to another cell 300, 400, 500, or the same or another, different beam 120-1, 120-2, 120-3, 120-1, 130-2, 130-3, 130-4 of another, different cell 300, 400, 500 served by another, different radio access node 110, 120, 130, 140, 150 and also includes the identifier in the first set which maps to the corresponding identifier of the second set and identifies the another cell 300, 400, 500, or the same or another, different beam 120-1, 120-2, 120-3, 120-1, 130-2, 130-3, 130-4 of another, different cell 300, 400, 500 served by another, different radio access node 110, 120, 130, 140, 150.

In a next step 290, the terminal 10-70 may, in response to the command received in the step S280, perform the handover and optionally may switch from the beam 120-1, 120-2, 120-3, 120-1, 130-2, 130-3, 130-4 to the another beam 120-1, 120-2, 120-3, 120-1, 130-2, 130-3, 130-4 using the identifier in the first set received in the command. This step 290 may be part of the step 130 and/or 150 or may be a separate step.

If the determination related to the second option in the step S260 is in the affirmative, the radio access node 110, 120, 130, 140, 150 may transmit a command to the radio terminal 10-70 in a step S270 and the radio terminal 10-70 may receive the command in a step S280, respectively. The command includes an instruction for the radio terminal 10-70 to switch from the current beam 120-1, 120-2, 120-3, 120-1, 130-2, 130-3, 130-4 to the another beam 120-1, 120-2, 120-3, 120-1, 130-2, 130-3, 130-4 and also includes the identifier in the first set which maps to the corresponding identifier of the second set and identifies the another beam 120-1, 120-2, 120-3, 120-1, 130-2, 130-3, 130-4. If the determination in the step S260 is not in the affirmative, the method may stop.

In a next step 290, the terminal 10-70 may switch, in response to the command received in the step S280, from the beam 120-1, 120-2, 120-3, 120-1, 130-2, 130-3, 130-4 to the another beam 120-1, 120-2, 120-3, 120-1, 130-2, 130-3, 130-4 using the identifier in the first set received in the command. This step 290 may be part of the step 130 and/or 150 or may be a separate step.

FIG. 7 shows a table 800 representing an exemplary mapping between a first set of identifiers and a second set of identifiers, i.e. a mapping 800 between a short identifier (such as "6") and a corresponding long identifier (such as "129"). According to the embodiment shown in FIG. 7 the long identifier may comprise 3 digits (which, when using 5 digits instead of 3, could be equivalent to up to about 15 bits). In contrast, the short identifier only uses 1 digit (which could be equivalent to up to about 3 bits). Therefore, a cell 200, 300, 400, 500, a beam 120-1, 120-2, 120-3, 130-1, 130-2, 130-3, 130-4, for a beam 120-1, 120-2, 120-3, 130-1, 130-2, 130-3, 130-4 within a cell 200, 300, 400, 500 may be identified using less information, i.e. few of bits.

It is noted that although in some embodiments it is referred to long identifier or short identifier, it is to be understood that these described embodiments equally generalized to the second identifier and the first identifier.

Although detailed embodiments have been described, these only serve to provide a better understanding of the disclosure defined by the independent embodiments and are not to be seen as limiting.

The invention claimed is:

1. A method in a radio access node for communicating with a radio terminal in a network system, the method comprising:
   transmitting to the radio terminal a mapping between a first set of identifiers and a second set of identifiers, each identifier identifying a reference signal in a network system;
   communicating with the radio terminal using at least one identifier in the first set of identifiers, the communicating comprising transmitting a command to the radio terminal, the command including one of the identifiers in the first set of identifiers and instructing the radio terminal to switch from a beam serving the radio terminal to a different beam identified by one of the identifiers in the second set of identifiers;
   each identifier in the first set of identifiers represented using fewer bits than the corresponding identifier in the second set of identifiers; and
   at least one of the identifiers in at least one of the first and second set of identifiers identifies a reference signal of one of a beam and a beam within a cell.

2. The method according to claim 1, wherein the mapping is transmitted to the radio terminal as part of a measurement configuration.

3. The method according to claim 1, wherein the second set of identifiers is used in a reference signal for intercell mobility between cells and/or beam management.

4. The method according to claim 1, wherein the reference signals identified by the first set of identifiers are determined based on measurements of corresponding reference signals performed by the radio terminal.

5. The method according to claim 1, wherein the method further comprises:
   determining, based on one or more measurement reports received from the radio terminal and each measurement report including at least one of the identifiers in the second set of identifiers, the corresponding set of first identifiers to be used in the mapping.

6. The method according to claim 5, wherein the number of identifiers in the first set is equal to or less than the number of identifiers in the second set.

7. The method according to claim 1, wherein the step of communicating comprises receiving from the radio terminal a measurement report including at least one of the identifiers in the first set of identifiers, the measurement report reporting about a measurement result of a measurement performed by the radio terminal on a reference signal identified by the corresponding one of the identifiers in the second set of identifiers.

8. The method according to claim 1, wherein the step of communicating comprises transmitting a command to the radio terminal, the command including one of the identifiers in the first set of identifiers and instructing the radio terminal to perform a measurement on a reference signal identified by one of the identifiers in the second set of identifiers.

9. A computer program comprising code, wherein the code, when executed on a processor, instructs said processor to perform a method according to claim 1.

10. A computer program product storing code, wherein the code, when executed on a processor, instructs said processor to perform a method according to claim 1.

11. A method in a radio terminal for communicating with a radio access node in a network system, the method comprising:
   receiving a mapping between a first set of identifiers and a second set of identifiers, each identifier identifying a reference signal in the network;
   communicating with the radio access node using the first set of identifiers, the communicating comprising receiving a command from the radio access node, the command including one of the identifiers in the first set of identifiers and instructing the radio terminal to switch from a beam serving the radio terminal to a different beam identified by one of the identifiers in the second set of identifiers;
   each identifier in the first set of identifiers represented using fewer bits than the corresponding identifier in the second set of identifiers; and
   at least one of the identifiers in at least one of the first and second set of identifiers identifies a reference signal of one of a beam and a beam within a cell.

12. The method according to claim 11, wherein the mapping is received by the radio terminal as part of a measurement configuration.

13. The method according to claim 11, wherein the second set of identifiers is used in a reference signal for intercell mobility between cells and/or beam management.

14. The method according to claim 11, wherein the radio terminal receives reference signals from radio access nodes, the reference signals being identified by the second set of identifiers.

15. The method according to claim 11, wherein the method further comprises:
   sending one or more measurement reports to the network system, each measurement report including at least one of the identifiers in the second set of identifiers, for determining the corresponding set of first identifiers to be used in the mapping.

16. The method according to claim 11, wherein the number of identifiers in the first set is equal to or less than the number of identifiers in the second set.

17. The method according to claim 11, wherein the step of communicating comprises sending a measurement report to the radio access node, the measurement report including at least one of the identifiers in the first set of identifiers, the measurement report reporting about a measurement result of a measurement of the radio terminal on a reference signal identified by the corresponding one of the identifiers in the second set of identifiers.

18. The method according to claim 11, wherein the step of communicating comprises receiving a command from the radio access node, the command including one of the identifiers in the first set of identifiers and instructing the radio terminal to perform a measurement on a signal identified by one of the identifiers in the second set of identifiers.

19. A radio access node for communicating with a radio terminal in a network system, the radio access node comprising at least one processor, a transceiver and a memory in which instructions are stored, which, when being executed by the at least one processor, causes the radio access node to:
- transmit, via the transceiver, to a radio terminal a mapping between a first set of identifiers and a second set of identifiers, each identifier identifying a reference signal in a network system;
- communicate, via the transceiver, with the radio terminal using at least one identifier in the first set of identifiers, the communication comprising transmitting a command to the radio terminal, the command including one of the identifiers in the first set of identifiers and instructing the radio terminal to switch from a beam serving the radio terminal to a different beam identified by one of the identifiers in the second set of identifiers;
- each identifier in the first set of identifiers represented using fewer bits than the corresponding identifier in the second set of identifiers; and
- at least one of the identifiers in at least one of the first and second set of identifiers identifies a reference signal of one of a beam and a beam within a cell.

20. A radio network system, comprising a radio access node according to claim 19 and a radio terminal for communicating with the radio access node in a network system, the radio terminal comprising at least one processor, a transceiver and a memory in which instructions are stored, which, when being executed by the at least one processor, causes the radio terminal to:
- receive, via the transceiver, a mapping between a first set of identifiers and a second set of identifiers, each identifier identifying a reference signal in the network; and
- communicate, via the transceiver, with the radio access node using the first set of identifiers.

21. A radio terminal for communicating with a radio access node in a network system, the radio terminal comprising at least one processor, a transceiver and a memory in which instructions are stored, which, when being executed by the at least one processor, causes the radio terminal to:
- receive, via the transceiver, a mapping between a first set of identifiers and a second set of identifiers, each identifier identifying a reference signal in the network;
- communicate, via the transceiver, with the radio access node using the first set of identifiers, the communicating comprising receiving a command from the radio access node, the command including one of the identifiers in the first set of identifiers and instructing the radio terminal to switch from a beam serving the radio terminal to a different beam identified by one of the identifiers in the second set of identifiers;
- each identifier in the first set of identifiers represented using fewer bits than the corresponding identifier in the second set of identifiers; and
- at least one of the identifiers in at least one of the first and second set of identifiers identifies a reference signal of one of a beam and a beam within a cell.

\* \* \* \* \*